(12) United States Patent
Trask

(10) Patent No.: US 6,171,683 B1
(45) Date of Patent: Jan. 9, 2001

(54) SHEET MATERIAL WITH CROSS-LINKING ADHESIVE

(75) Inventor: Blair D. Trask, Rangeley, ME (US)

(73) Assignee: Omniflex, Greenfield, MA (US)

( * ) Notice: Under 35 U.S.C. 154(b), the term of this patent shall be extended for 0 days.

(21) Appl. No.: 09/092,978

(22) Filed: Jun. 8, 1998

(51) Int. Cl.$^7$ .................................................. B32B 3/00
(52) U.S. Cl. ............................ 428/195; 428/76; 428/354; 428/97; 427/210; 427/261
(58) Field of Search ................................. 427/244, 261, 427/210; 428/76, 77, 97, 354, 355 R

(56) References Cited

U.S. PATENT DOCUMENTS 5,286,325  2/1994  Miyota et al. .

FOREIGN PATENT DOCUMENTS 2122413  10/1995  (CA) .
0 773 095  5/1997  (EP) .

*Primary Examiner*—Merrick Dixon
(74) *Attorney, Agent, or Firm*—Fish & Richardson, PC

(57) ABSTRACT

A sheet material may be prepared and stored by applying an adhesive to one side of a first sheet and applying a second sheet to the adhesive to form a trilaminate. The trilaminate is placed into a container that is substantially free of moisture and the container is sealed so that the trilaminate can be stored in an atmosphere substantially free of moisture. The adhesive is a cross-linking polymer that reacts with moisture to form cross-linked bonds.

15 Claims, 7 Drawing Sheets

SHEET MATERIAL WITH CROSS-LINKING ADHESIVE

CROSS REFERENCE TO RELATED APPLICATION

This application claims priority to U.S. application Ser. No. 08/963,308, filed on Nov. 3, 1997, which itself claims priority from U.S. application Ser. No. 08/743,392, filed Nov. 4, 1996, and U.S. application Ser. No. 08/229,685, filed Apr. 19, 1994. All of these applications are incorporated by reference.

BACKGROUND

This invention relates to sheet materials with adhesives used in making, for example, covered foam products.

Automobile seat cushions and other foam products are typically produced by a foam-in-place process in which the seat cushion is chemically foamed against a finish fabric covering the seat. The process often begins by first laminating a lubricant-free urethane barrier layer to the finish fabric by, for example, flame lamination. A thin layer of foam placed between the fabric and the barrier layer acts as an adhesive to bond the fabric to the barrier. The resulting tri-layer fabric/foam/barrier composite is then cut and sewn into a sock cushion.

When the finished seat is sewn together from several different pieces of finish fabric, the seams of the sock cushion are sealed prior to foaming to prevent liquid components in the foaming process from bleeding through the finish fabrics and to assure a good vacuum barrier during the process of molding the foam cushion.

For ease of handling in cutting and sewing the composite, a slip sheet may be bonded to a surface of the barrier. For example, a polyethylene sheet may be heat bonded to the barrier to provide a slippery surface that prevents the composite from catching under the presser foot of a sewing machine.

SUMMARY

In one general aspect, a sheet material may be prepared and stored by applying an adhesive to one side of a first sheet, applying a second sheet to the adhesive to form a trilaminate, placing the trilaminate into a container that is substantially free of moisture, and sealing the container so that the trilaminate can be stored in an atmosphere substantially free of moisture. The adhesive is a cross-linking polymer that reacts with moisture to form cross-linked bonds.

Embodiments may include one or more of the following features. For example, the adhesive may include an isocyanate terminated oligomer and may soften in a temperature range between 60 and 72° Celsius. The cross-linked adhesive also may form a strong chemical bond that is heat resistant and will withstand temperatures greater than 100° Celsius and relative humidities of approximately 95%.

The adhesive may be heated to approximately 125° Celsius in a hot melt premelter prior to applying the adhesive to a roller. The adhesive may be applied to the first sheet from the roller by pressing the roller against the first sheet. The adhesive may form a continuous layer or may define discrete patterns, such as patterns resembling rows of pyramids.

The first sheet may include a polymer, such as polypropylene, that does not distort at temperatures of approximately 125° Celsius. Another property of the first sheet is that it may be peeled away from the solidified adhesive.

The second sheet may be nipped to the applied adhesive and may include a high molecular weight polyether-based thermoplastic urethane that is substantially free of moisture. The second sheet also may include an ethylene/vinylacetate copolymer, an ethylene acrylate copolymer, a metalocene-catalyzed olefin whose surface is treated for adhesion, an ionomer, or a film made using a resin having a relatively low softening or forming temperature and being free of lubricants or slip adhesives.

After the second sheet is nipped to the applied adhesive to form the trilaminate, the trilaminate may be passed over a cooling roll to cool the trilaminate and solidify the adhesive. After the trilaminate is placed in the container, dry air with a dew point below −10° Celsius may be used to purge the container.

In another general aspect, a sheet material includes a first polymer layer, a layer of adhesive bonded to the first polymer layer, and a second polymer layer covering the adhesive. The adhesive may include an isocyanate terminated oligomer.

In another general aspect, an article, such as a seat cushion, may be made by placing a barrier layer and a cover material in a shaped mold, creating foam by an exothermic reaction in a cavity defined by the barrier layer in the mold, and bonding the barrier layer to the cover material. The bonding is accomplished by using the reaction heat created in the exothermic reaction and the moisture in the ambient air and cover material.

Embodiments may include one or more of the preceding or following features. For example, prior to creating foam in the cavity, a vacuum may be applied to the mold to cause the barrier layer and cover material to conform in shape to the interior of the mold. The foam may be created by pouring chemicals into the mold, with the chemicals reacting to form the foam. The chemicals may include an isocyanate and a polyol mixture. After the foam sets, the cover material, barrier layer, and foam may be removed from the mold.

The cover material may be cut into pieces and sewn together to form a shell of the article, with the shell having an opening. The barrier layer may be formed by applying a cross-linking isocyanate terminated oligomer adhesive to one side of a sheet of polypropylene. A second sheet may be applied to the cross-linking adhesive to form a trilaminate. The second sheet may include a freshly-produced, high molecular weight polyether-based thermoplastic urethane. The trilaminate may be placed and stored in a container that is substantially free of moisture.

Other features and advantages of the invention will be apparent from the following description, including the drawings, and from the claims.

DESCRIPTION

Figure 1A:
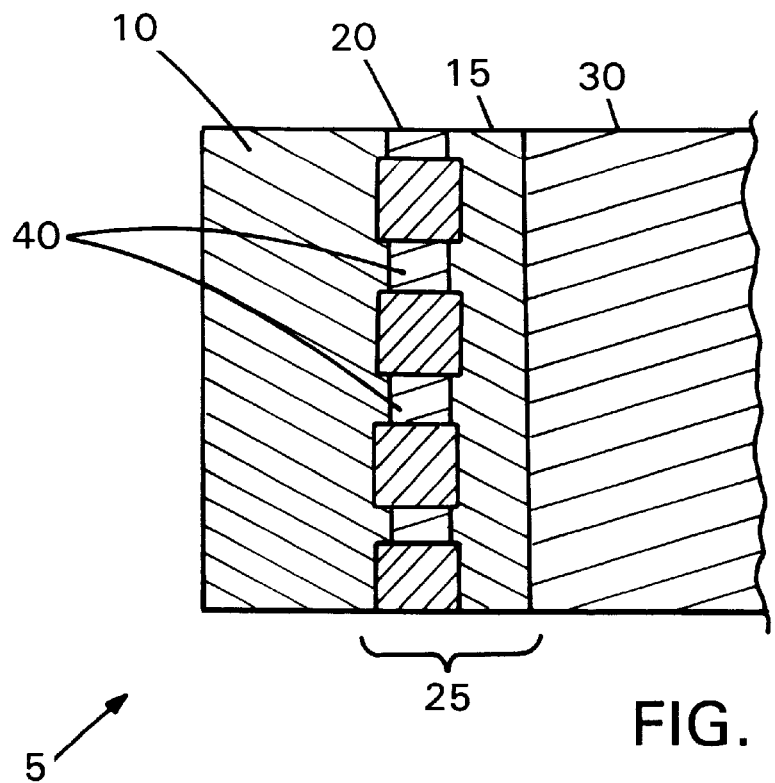
FIG. 1A is cross-sectional view of a multi-layered cushion.

Referring to FIG. 1A, a cushion 5 (not drawn to scale) may be used, for example, as a covered automobile seat cushion through a foam-in-place process. The cushion 5 has a cover material 10, such as a finish fabric or leather. A urethane film 15 bonded to a discontinuous, non-tacky adhesive layer 20 forms a sheet material 25 that acts as a barrier layer for the cover material. Urethane film 15 is substantially pin-hole free and thus provides an air-tight vacuum barrier and also a liquid foam chemical barrier during the foaming-in-place of a foam pad 30 for the finished cushion. The urethane film is also lubricant-free to adhere chemically to liquid foaming agents used in the foaming process.

Figure 1B:
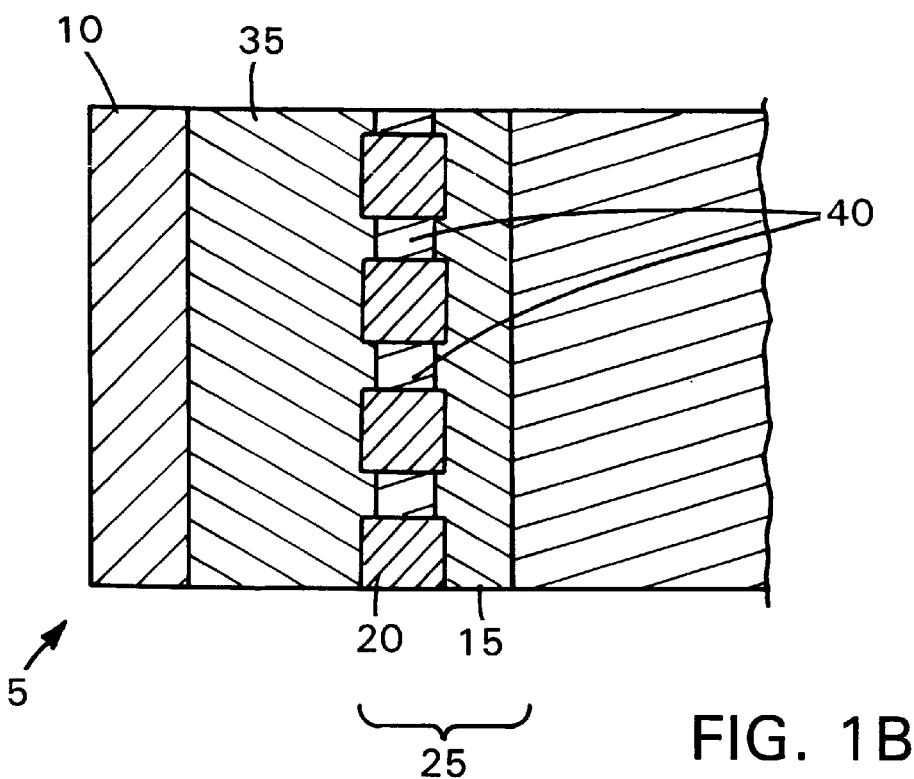
FIG. 1B is a cross-sectional view of a multi-layered cushion having a preformed foam layer.

Referring to FIG. 1B, cushion 5 also may have a preformed foam layer 35 bonded to the cover material 10.

Referring to FIGS. 1A and 1B, the discontinuous adhesive layer 20 has gaps or holes 40, i.e., regions without adhesive material. The gaps may be distributed either randomly or in a pattern across adhesive layer 20. The proportion of gap area to total surface area for the adhesive layer may be in the range of 10% to 30%, typically 10% to 20%, more typically about 15%.

Figure 2A:
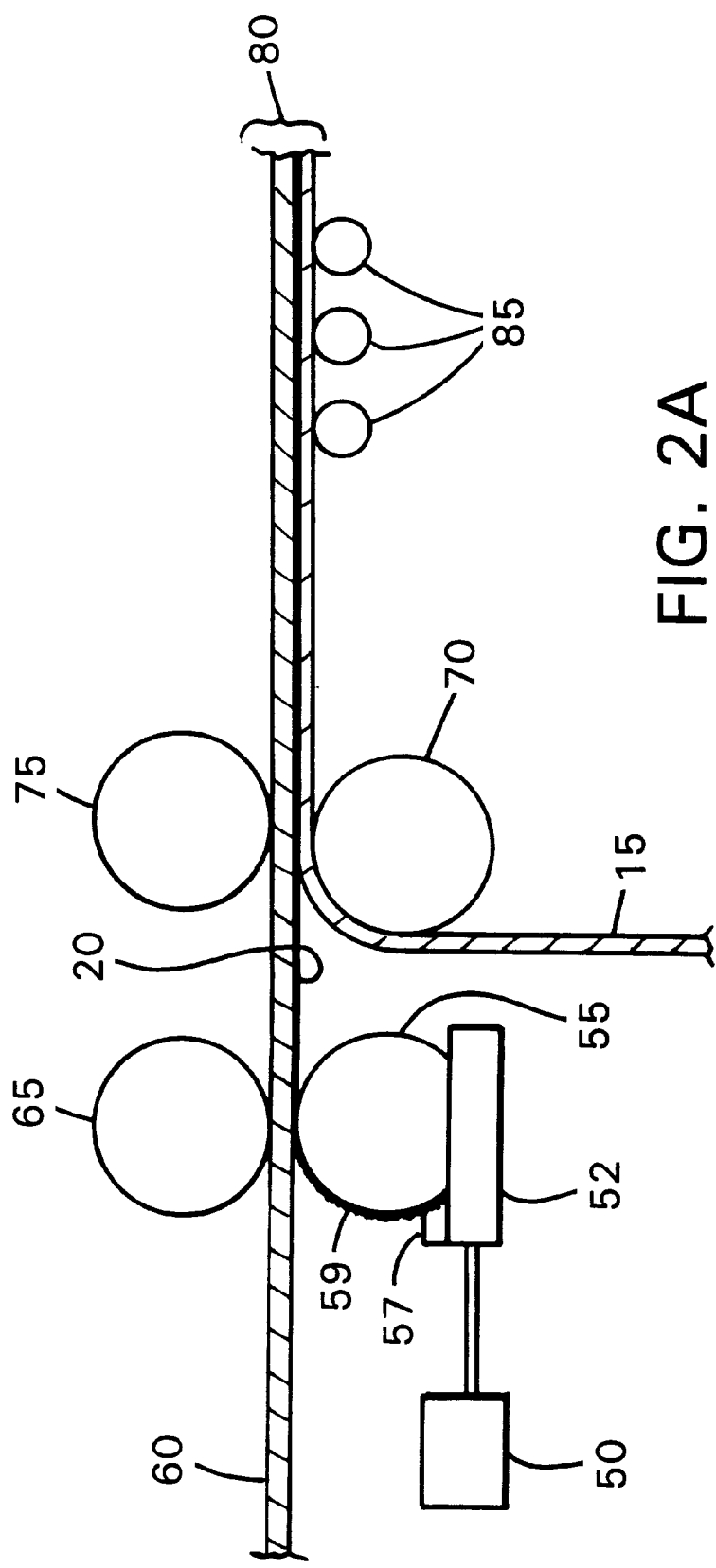
FIG. 2 is a cross-sectional view of a lamination process.

The sheet material 25 is separately assembled in an adhesive printing and film nipping process as shown in FIG. 2. The adhesive is heated to approximately 125° Celsius in a hot melt premelter 50. The hot melt premelter pumps the adhesive into a pan 52 in a viscous form. A print (or engraved gravure) roll 55 turns in the pan 52. A doctor blade 57 scrapes excess adhesive from the roll, leaving a layer of adhesive 59 on the roll 55. Hot melt premelters are available from Nordson in Norcross, Ga.

The adhesive layer 20 of the sheet material 25 softens at 65.520 Celsius±5.5° Celsius, and becomes tacky at lower temperatures approaching that range. The adhesive, an isocyanate oligomer, has terminal isocyanate groups that react with moisture and cross-link. The cross-linked adhesive forms a strong chemical bond that is heat resistant. For instance, the adhesive-based bond between the urethane 15 and cover material 10 will withstand temperatures greater than 100° Celsius and 95% relative humidity to provide the durability needed for automobile seat cushions.

A continuous sheet of polypropylene 60 is pulled between the print roll 55 and an opposite roll 65. The print roll impresses the polypropylene sheet with the adhesive according to the roll's surface pattern as the polypropylene passes between the print roll 55 and opposite roll 65. This results in a more controlled adhesive pattern than would occur if the adhesive were sprayed directly onto the sheet 60. This step is performed while the adhesive is sufficiently hot and tacky so that the adhesive will wet and bond to the surface of the urethane film 15 during the nipping step.

Polypropylene is used because it does not distort when the heated adhesive is applied to its surface. Moreover, the adhesive will freely release from the surface of the polypropylene after it cools and solidifies. The adhesive is placed on the polypropylene in discrete patterns. For example, referring to FIGS. 2B and 2C, the adhesive may be placed on the polypropylene so that it resembles rows of pyramids 67. This pattern has been shown to effect good adhesive contact. The adhesive also may be applied as a continuous layer.

Adjacent to rolls 55 and 65, a pair of nip rolls 70 and 75 nip a film 15 of freshly produced high molecular weight polyether-based thermoplastic urethane against the layer of adhesive to form a trilaminate 80. An example of such a film is Vacuflex®, which is available from Omniflex Limited Partnership of West Bridgewater, Mass. Film 15 also may be an ethylene/vinylacetate copolymer, an ethylene acrylate copolymer, a metalocene-catalyzed olefin whose surface is treated for adhesion, an ionomer, or a film made using a resin having a relatively low softening or forming temperature and being free of lubricants or slip adhesives.

The trilaminate then is passed over a series of cooling rolls 85 to bring the trilaminate to room temperature and solidify the adhesive layer. The trilaminate 80 is then spooled as a roll (not shown), removed, and placed in a bag (not shown) constructed of a polyester film/aluminum foil/polyethylene film. The bag is purged with dry air with a dew point below −10° Celsius to eliminate all moisture in the bag. The bag is then heat sealed to ensure an airtight package.

During use, trilaminate 80 is removed from the bag and cut to lengths or left as a continuous piece, as desired. Removing the trilaminate 80 from the bag exposes the materials to air. Moisture in the air has the potential to cause the adhesive to begin cross-linking prematurely. To avoid premature cross-linking, the trilaminate 80 should be used soon after exposure to air (e.g., less than two hours after opening). In some tests, after 24 hours of exposure to ambient air, the first 15 to 20 yards of the rolled trilaminate 80 did not function suitably because of premature cross-linking of the adhesive.

Figure 3:
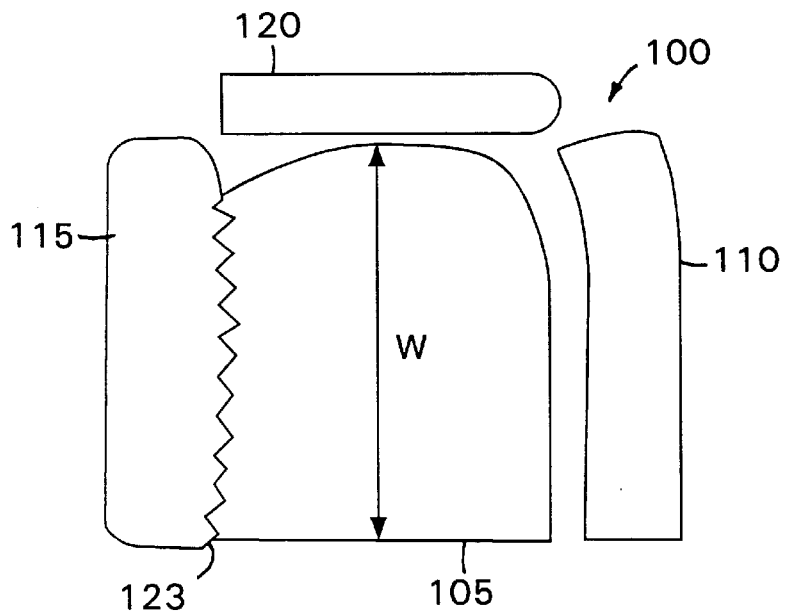
FIG. 3 is a plan view of patterns for making an automobile seat.
Figure 4:
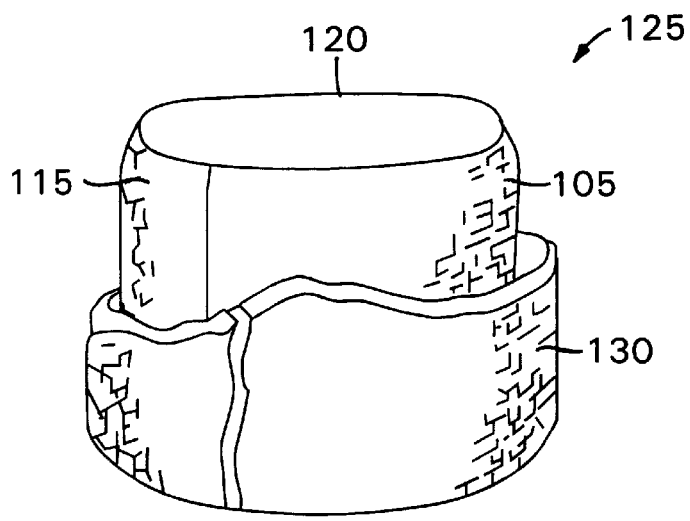
FIG. 4 is a perspective view of a shell of a seat cushion formed of the patterns of FIG. 3 and partially turned inside-out.

Pattern pieces 100 are then cut from a bolt of the cover material 10 as shown in FIG. 3. Pattern pieces 100 may include a front piece 105, a pair of side pieces 110 and 115, a top piece 120, and a rear piece (not shown). These pieces are sewn together with a row of stitches 123 to form a seat cushion shell 125. As shown in FIG. 4, shell 125 is then turned inside out, so that an inner surface 130 is exposed on the outside of the shell.

Figure 5:
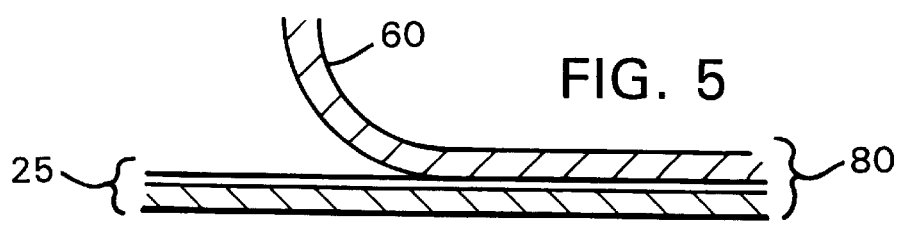
FIG. 5 is a cross-sectional view of a trilaminate in which one layer is partially peeled away.
Figure 6:
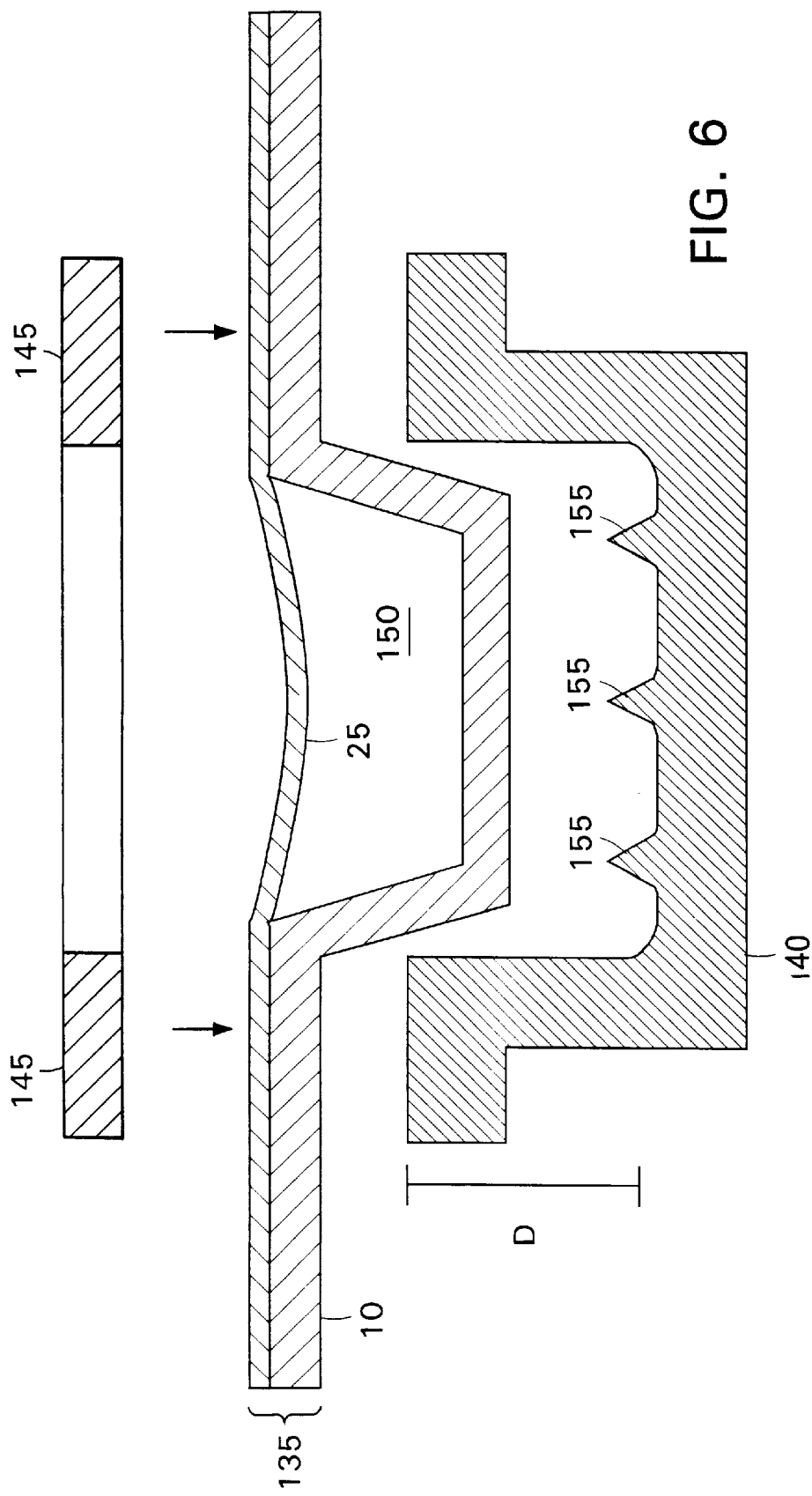
FIG. 6 is a cross-sectional view of a seat cushion shell and a mold.

As shown in FIG. 5, prior to the foam-in-place process, the polypropylene layer 60 of the trilaminate 80 is peeled away from the sheet material 25 (i.e., the adhesive bonded to the urethane layer). The polypropylene layer 60 is discarded. Next, as shown in FIG. 6, the cover material 10 of a shell 135 (not shown to scale) is positioned over mold 140. The depth D of the mold 140 is slightly smaller than the width W of the front pattern 105 and the width of each side piece 110, 115 (FIG. 3). The sheet material 25 is then placed over the cover material 10 and held in place by a perimeter clamp frame 145. A space 150 between the mold 140 and the sheet material 25 is then evacuated to pull the sheet material and the cover material 10 snugly against the mold 140. This forces the sheet material and the cover material to conform to a contour 155 of the mold. Thus, the sheet material 25 serves to conform to the mold cavity.

Figure 7:
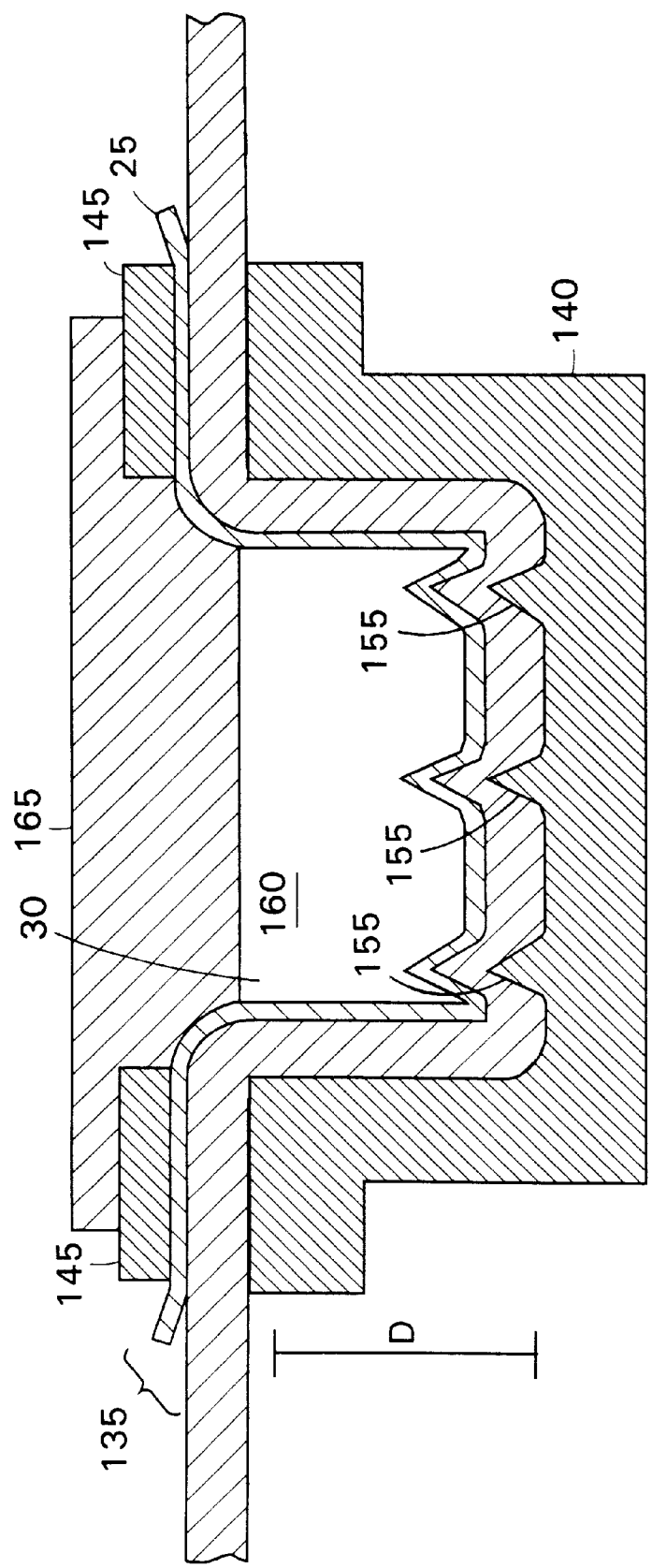
FIG. 7 is a cross-sectional view of the shell and mold of FIG. 6, with another mold, and foam between the molds.

Referring to FIG. 7, after the space between the mold and the sheet material is evacuated, as shown, liquid reactive chemical foam constituents, such as isocyanate and polyol, are poured into a mold cavity 160. A second mold 165 is placed over the main mold 140 and the perimeter clamp frame 145 to close the mold cavity 160 to contain the chemical constituents in the mold cavity, and to regulate the final shape and density of the foam in the mold cavity. The chemical constituents react to create a foam which increases in volume to fill the mold cavity. The foam flows over and bonds inseparably to the sheet material 25. The foam then "sets" to form urethane foam pad 30 having a surface detail corresponding to mold contour 155.

The chemical constituents react exothermically to create the foam. The heat of this reaction generates an exotherm of approximately 65.5° Celsius. The adhesive layer 20 of the sheet material 25 softens at 65.5° Celsius±5.5° Celsius. Thus, during the foam reaction the adhesive is softened so that it covers the seams and causes the adhesive to penetrate into the surface of the cover material 10. As explained above, the adhesive has terminal isocyanate groups that react with moisture in the air and cover material 10 and cross-link. The cross-linked adhesive thereby forms a strong chemical bond with the cover material that is heat resistant.

After the foam has set, the second mold 165 is removed and the perimeter clamp frame 145 loosened to allow the shell 135 and the attached foam pad 30 to be removed from the mold. Other components, e.g., plastic or metal parts (not shown), may now be added to the foam pad.

Figure 8:
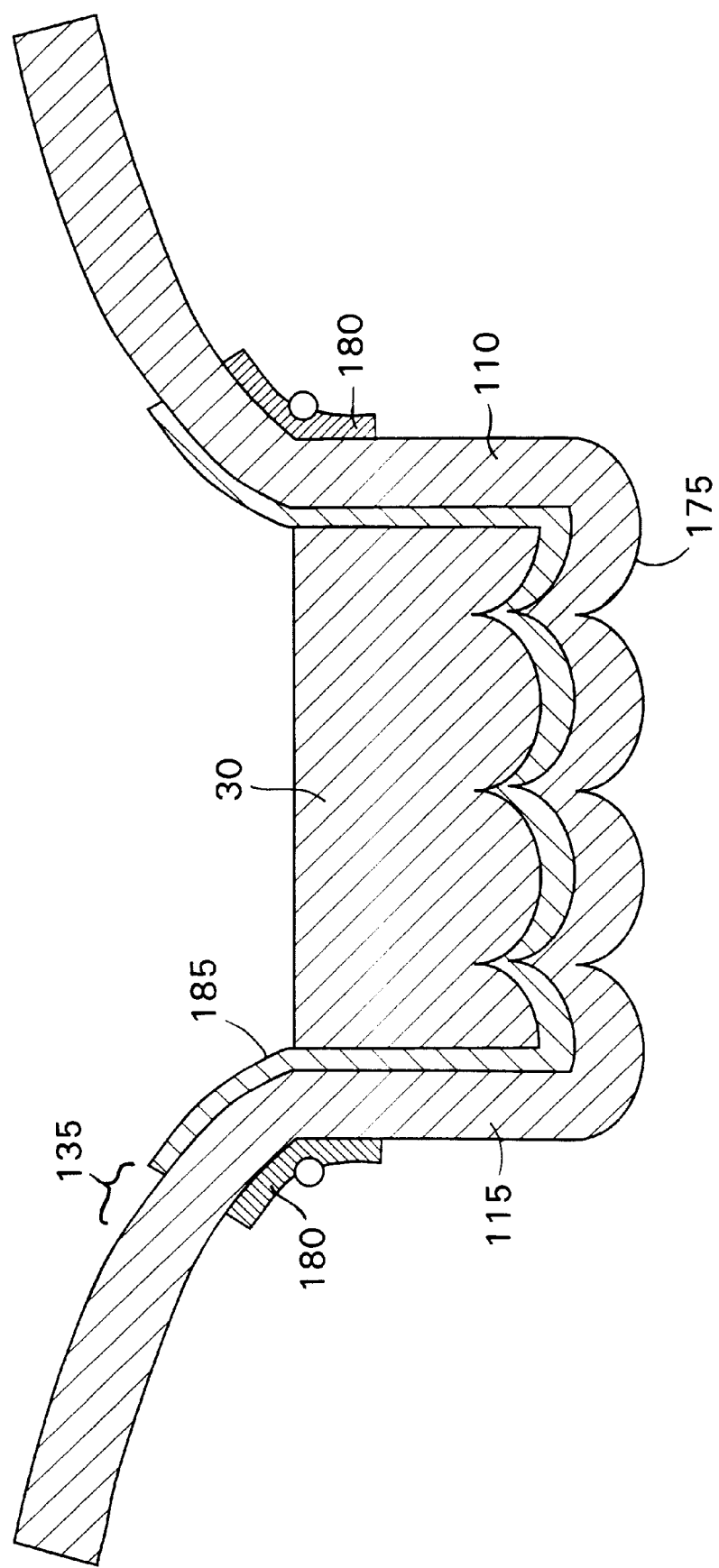
FIG. 8 is a cross-sectional view of a covered automobile seat cushion.

Referring to FIG. 8, the foam pad 30 and shell 135 removed from the mold provide a seat cushion 175 having an upholstery covering the foam pad 30. Detail work for the finished seat, such as a vinyl reinforcement 180 at a non-stitched end 185, may then be added. Alternatively, the final detail work and vinyl reinforcement may be done before the foaming process.

Urethane film 15 in sheet material 25 is formed of urethane resin (e.g., a Vacuflex film available from Omniflex Limited Partnership in West Bridgewater, Mass., BASF SP806, or other products within the same family of resins) with a constant thickness T in the range of about 0.5 to 10 mils, typically 1 to 3 mils, and more typically about 2 mils. Because urethane film 15 faces the liquid agents which become the urethane foam pad, film 15 is pinhole-free, even when stretched slightly. Film 15 also is essentially lubricant-free to enhance bonding to the foam. Preferably, the film is completely lubricant-free, but it may have small amounts (e.g., less than an aggregate of 2%) of impurities such as heat stabilizers or UV stabilizers or other processing additives. Other materials that could be used for the film include an ethylene/vinylacetate copolymer, an ethylene acrylate copolymer, a metalocene-catalyzed olefin whose surface is treated for adhesion, an ionomer, or a film made using a resin having a relatively low softening or forming temperature and being free of lubricants or slip adhesives. Generically, the materials that would work best would have the properties of being elastic, thermoplastic, pin-hole free, able to adhere to the chemicals or substrates involved in the process, and durable and able to withstand whatever flexing takes place in the ultimate product.

Figure 9:
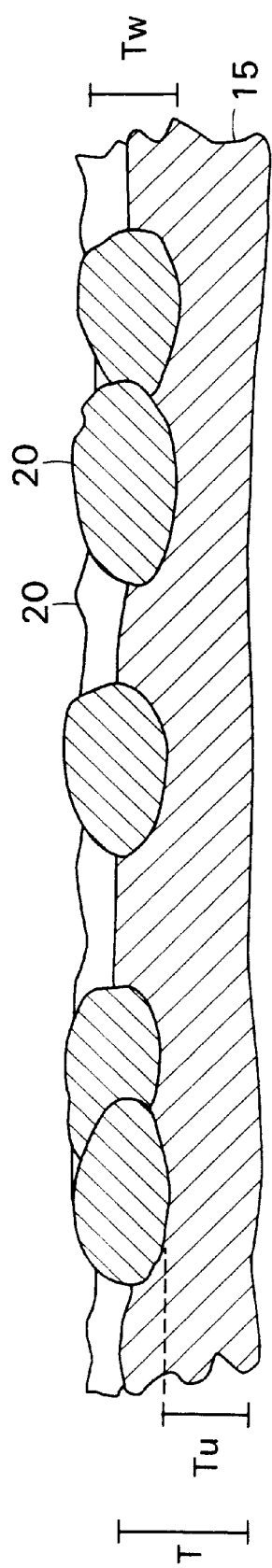
FIG. 9 is a magnified schematic side view of the sheet material.

Referring to FIG. 9, the adhesive layer may be applied to the polypropylene layer using the print or engraved gravure roll at a typical basis weight of 0.8 oz/yd$^2$ to 0.4 oz/yd$^2$. Other concentrations of adhesive also may be applied. After nipping the urethane film 15 to the adhesive layer 20, the thickness $T_w$ of the adhesive layer may be between 0.002 inches to 0.020 inches, but is typically 0.007 inches. The resulting discontinuous adhesive layer on the urethane has a large exposed surface area to volume ratio and a small heat mass. The discontinuous adhesive layer provides a several-fold increase in the thickness of the layer over a continuous adhesive layer of identical weight. Thus, a smaller amount of adhesive can be used to obtain the same power of adhesion provided by the continuous layer. These features allow the adhesive to be rapidly and evenly melted when heated and also to bond in a stable manner to the cover material.

Other embodiments are within the scope of the following claims.

What is claimed is:

1. A sheet material comprising:
   a first polymer layer;
   a layer of a cross-linking adhesive bonded to the first polymer layer, wherein the adhesive cross links in the presence of moisture; and
   a second polymer layer covering the adhesive.

2. The sheet material of claim 1, wherein the second polymer layer does not distort at temperatures of approximately 125° Celsius.

3. The sheet material of claim 1, wherein the second polymer layer does not bond with the solidified adhesive so that it can be peeled away from the solidified adhesive.

4. The sheet material of claim 1, wherein the second polymer comprises polypropylene.

5. The sheet material of claim 4, wherein the adhesive includes an isocyanate terminated oligomer.

6. The sheet material of claim 5, wherein the adhesive softens in a temperature range between 60 and 72° Celsius.

7. The sheet material of claim 5, wherein the cross-linked adhesive forms a heat resistant chemical bond.

8. The sheet material of claim 5, wherein the cross-linked adhesive can form bonds that will withstand temperatures greater than 100° Celsius and relative humidities of approximately 95%.

9. The sheet material of claim 5, wherein the adhesive defines patterns on the first layer.

10. The sheet material of claim 9, wherein the shape of the discrete patterns resemble rows of pyramids.

11. The sheet material of claim 1, wherein the first polymer layer includes a high molecular weight polyether-based thermoplastic urethane.

12. The sheet material of claim 1, wherein the first polymer layer includes an ethylene/vinylacetate copolymer, an ethylene acrylate copolymer, a metalocene-catalyzed olefin whose surface is treated for adhesion, an ionomer, or a film made using a resin having a relatively low softening or forming temperature and being free of lubricants or slip adhesives.

13. The sheet material of claim 11, wherein the urethane sheet is substantially free of moisture.

14. A sheet material comprising:
   a first polymer layer including a polyether-based thermoplastic urethane substantially free of moisture;
   a layer of a solidified, cross-linking adhesive bonded to the first polymer layer and defining patterns thereon, wherein the adhesive cross-links in the presence of moisture to form a chemical bond that withstands temperatures greater than 100° Celsius and relative humidities of approximately 95%; and
   a second polymer layer covering the solidified adhesive, wherein the second polymer layer does not bond with the solidified adhesive so that the second polymer layer can be peeled away from the solidified adhesive.

15. A sealed bag containing the sheet material of claim 14.

* * * * *